June 9, 1931.   E. POKORNY ET AL   1,809,792
DEVICE FOR CUTTING VEGETABLES
Filed May 17, 1929
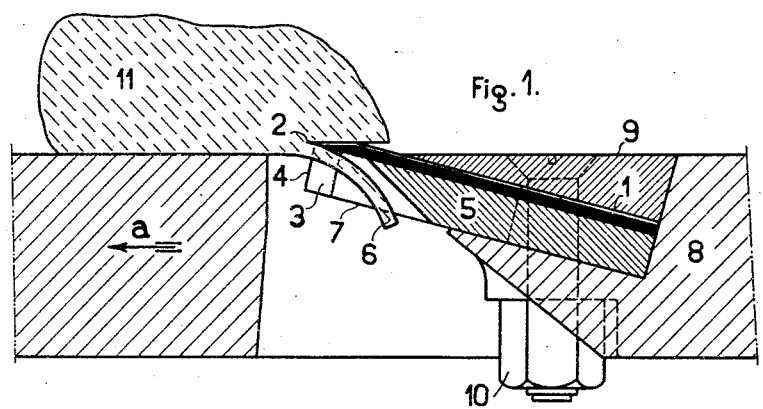
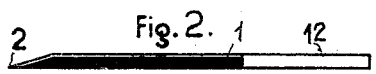 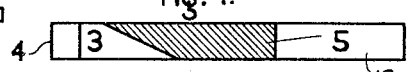
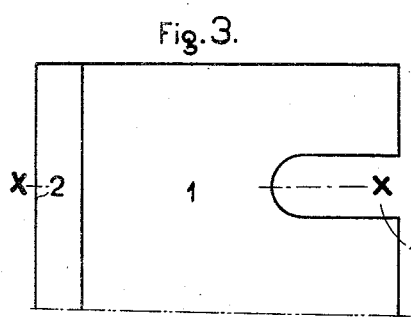 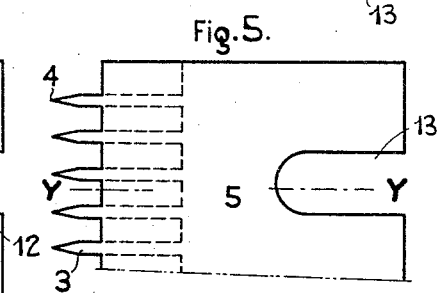
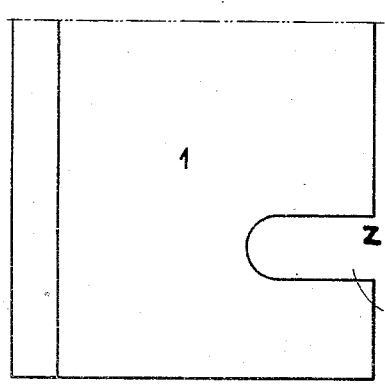 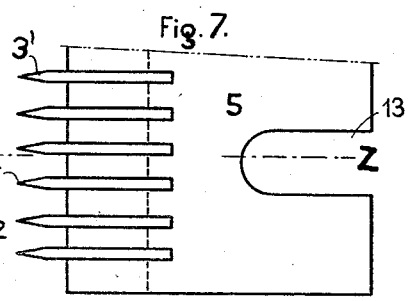

Patented June 9, 1931

1,809,792

UNITED STATES PATENT OFFICE

ERMIN POKORNÝ AND JOSEF NESMĚRÁK, OF PRAGUE, CZECHOSLOVAKIA

DEVICE FOR CUTTING VEGETABLES

Application filed May 17, 1929, Serial No. 363,910, and in Czechoslovakia May 25, 1928.

The invention relates to a device for cutting vegetables such as beetroots or turnips into strips or fingers of substantially rectangular cross-section.

The device according to the invention consists of a primary outer blade for cutting the vegetable into slices, and a separate secondary inner cutting component having a series of blades with cutting edges arranged preferably at right-angles to the primary blade for cutting the slices into strips or fingers. With this arrangement the cutting edges of both the primary blade and the secondary cutting component can be separately ground and consequently kept quite sharp at all times.

Two constructions of the device according to the invention are illustrated in the accompanying drawings in which:—

Figure 1 is a longitudinal section of the complete device;

Figure 2 is a section of the primary cutting blade on the line X—X of Figure 3;

Figure 3 is a plan view of the primary cutting blade;

Figure 4 is a section of the secondary cutting component on the line Y—Y of Figure 5, according to one form;

Figure 5 is a plan view of the secondary cutting component, and

Figures 6 and 7 are views corresponding to Figures 4 and 5 of the secondary cutting component according to another form, Figure 6 being a section on the line Z—Z of Figure 7.

The primary outer blade 1 is provided with the straight cutting edge 2 as also with the usual slots or cut-out parts 12 for the passage of the fastening bolts or screws 10. The secondary inner cutting component 5, which is also provided with slots or cut-out parts 13 for the passage of the fastening bolts or screws 10, is provided with a number of frontal projecting teeth 3, arranged adjacent to each other like the teeth of a comb. These teeth are formed with cutting edges 4 arranged preferably at right-angles to the cutting edge 2 of the primary outer blade 1. Instead of forming the teeth 3 in one piece with the component 5, as shown in Figures 4 and 5, they may be constituted by separate pieces fitted into corresponding slots in the component 5 as shown in Figures 6 and 7.

The primary outer blade 1 together with the secondary inner component 5 abutting thereon and a filling piece 9, are inserted in a recess of the table 8, or in the usual knife carrier, in such manner that the cutting edge 2 projects above the surface of the table 8 corresponding to the desired thickness of the slice, and is fixed by means of the bolts or screws 10 in the usual manner so that slices may be successively cut from the vegetable 11 (Figure 1). Simultaneous with the production of each slice it is divided into strips or fingers 6 by the cutting edges 4 of the secondary component 5.

What we claim and desire to secure by Letters Patent of the United States is:—

1. In a device for cutting vegetables, a slicing blade having a sharpened forward edge, and a second blade positioned beneath and in contact with the slicing blade, said second blade having at its forward end a plurality of separable fingers the free ends of which are sharpened to provide cutting edges extending substantially at right angles to the edge of the slicing blade and having their ends adjacent the slicing blade slightly in the rear of the edge of said slicing blade.

2. A vegetable cutter comprising a table, two superposed blades, the upper blades having a sharpened forward edge and the other blade having at its forward edge a series of spaced teeth the free ends of which are sharpened and extend substantially at right angles to the cutting edge of the upper blade, and a single fastening means holding the two blades in abutting relation throughout their area and connecting the blades to the table.

ERMIN POKORNÝ.
JOSEF NESMĚRÁK.